March 8, 1932.　　　J. L. DRAKE　　　1,848,111
PROCESS AND APPARATUS FOR PRODUCING SHEET GLASS
Filed June 8, 1928　　　2 Sheets-Sheet 1
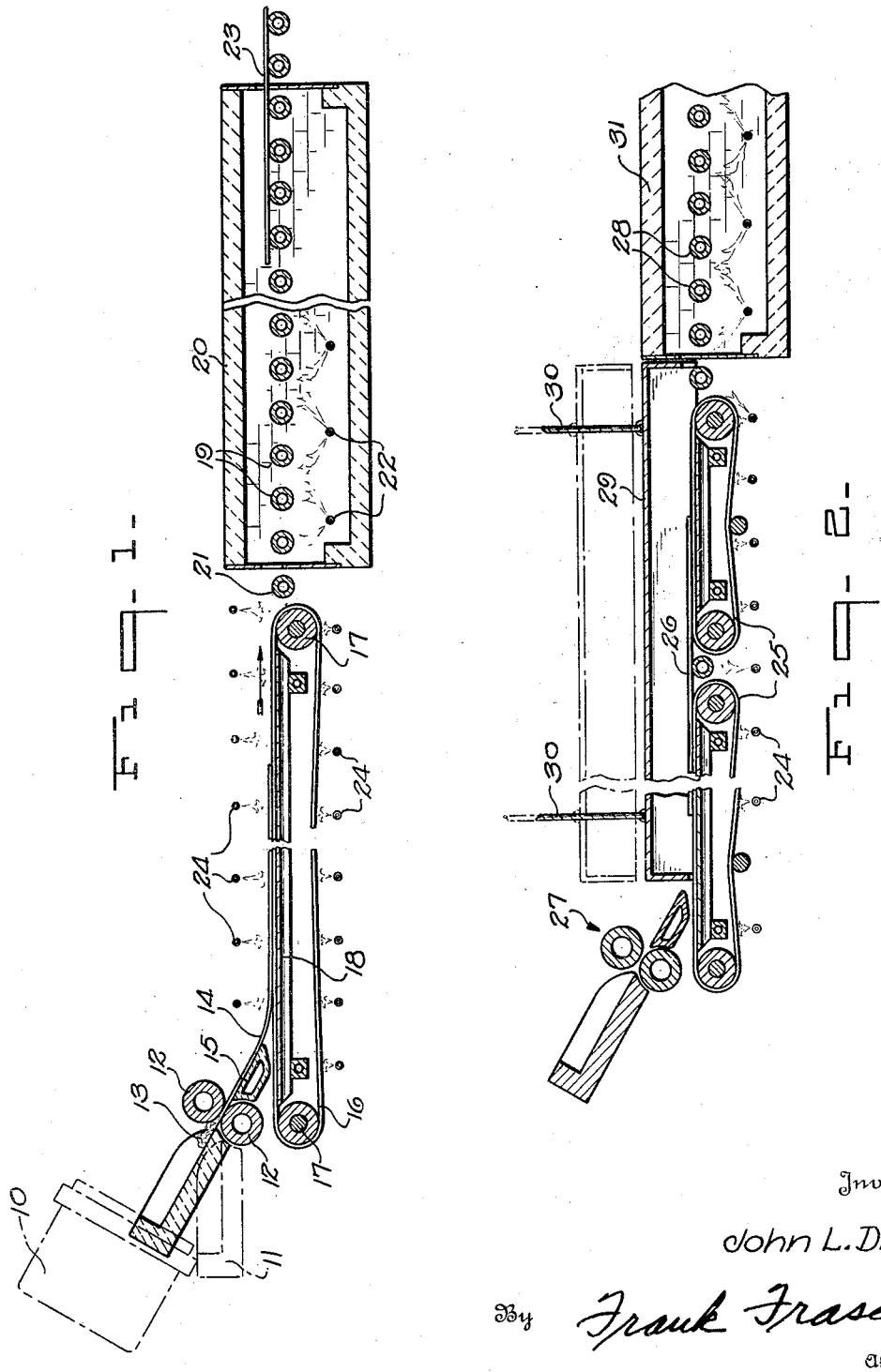
Inventor
John L. Drake.
By Frank Fraser
Attorney March 8, 1932. J. L. DRAKE 1,848,111
PROCESS AND APPARATUS FOR PRODUCING SHEET GLASS
Filed June 8, 1928 2 Sheets-Sheet 2

Inventor
John L. Drake.
By Frank Fraser,
Attorney

Patented Mar. 8, 1932

1,848,111

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR PRODUCING SHEET GLASS

Application filed June 8, 1928. Serial No. 283,754.

The present invention relates to a process and apparatus for producing sheet glass.

An important object of the invention is to provide a process and an apparatus for producing sheet glass wherein a sheet is formed from a mass of molten glass and deposited upon a movable conveyor created from one or more endless belt formations, the speed of the sheet being reduced while on said conveyor, after which the sheet is fed into and through an annealing leer.

Another object of the invention is to provide means for reducing a potful of molten glass to sheet form, the sheet being passed upon a conveyor whose speed is approximately the same as the speed at which the sheet is formed, the speed of the conveyor being reduced after the entire sheet length has been arranged thereon, after which the sheet is fed into and through an annealing leer at a speed substantially the same as the reduced speed of the conveyor.

A still further and important object of the invention is to provide means wherein a mass of molten glass is reduced to sheet form at one speed, then while the entire sheet is supported on a conveyor the speed thereof is reduced, the sheet being preferably protected against undue chilling while on said conveyor, after which the sheet is passed through an annealing leer at substantially one speed from one end of the leer to the other.

Other objects and advantages of the invention will become more apparent during the course of the following description when taken in connection with the accompanying drawings.

Figure 3:
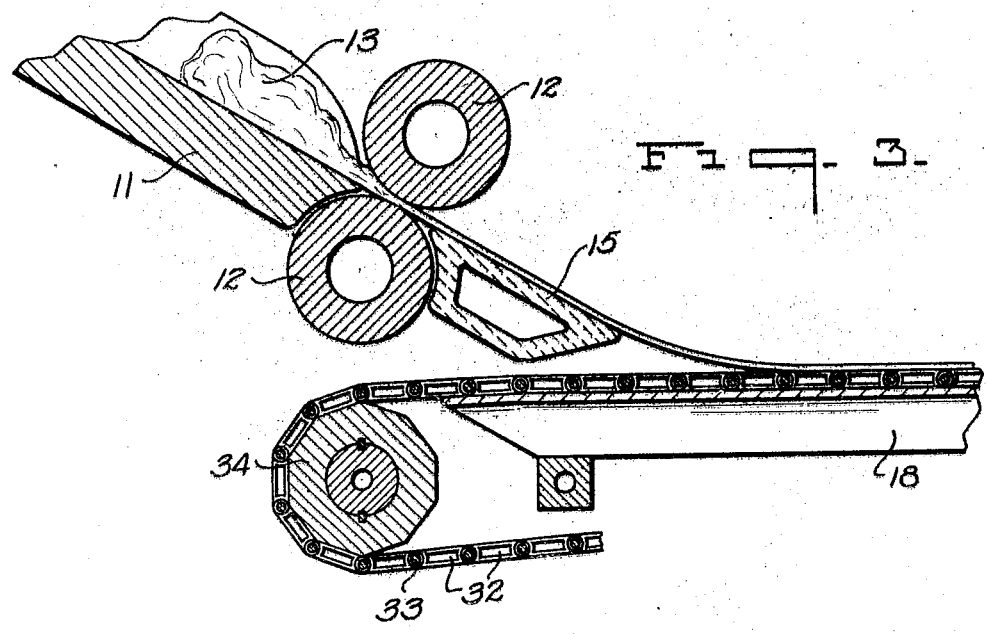
Figure 4:
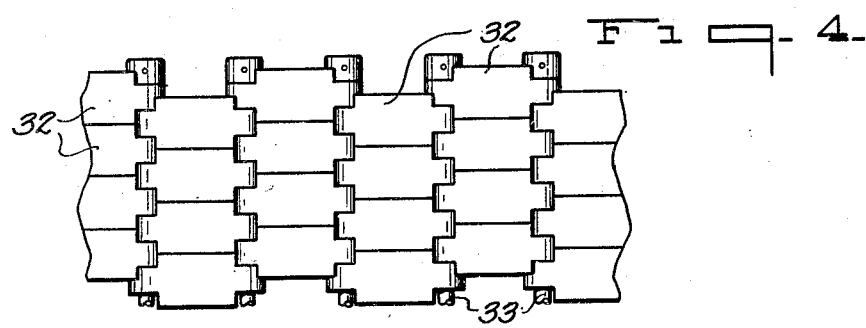
Figure 5:
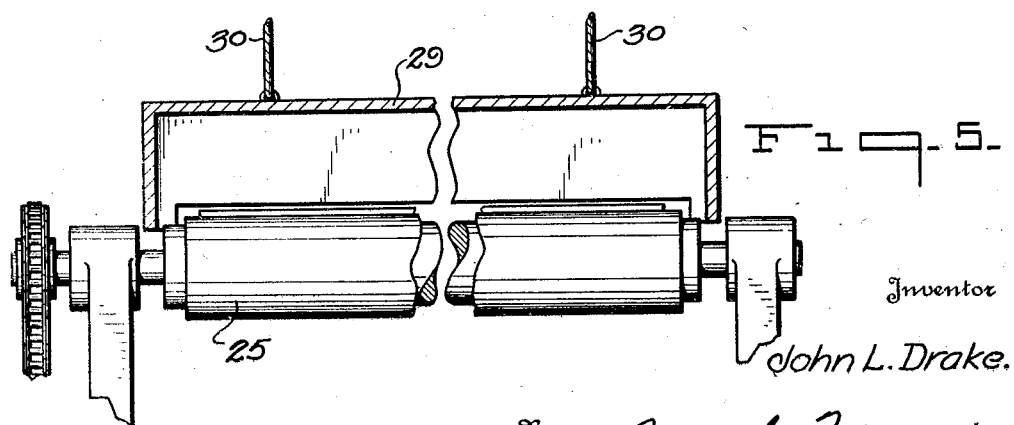

In the drawings wherein like numerals are employed to designate like parts throughout the same, Fig. 1 is a diagrammatic vertical longitudinal section through an apparatus embodying my improved construction, Fig. 2 is a similar view showing a slightly modified form of construction, Fig. 3 is a fragmentary vertical sectional view showing a detail of one type of conveyor, Fig. 4 is a fragmentary top plan view of said conveyor, and Fig. 5 is a vertical transverse section through the construction illustrated in Fig. 2.

The present invention relates more particularly to an intermittent process of producing sheet glass, and it is preferred that "pot" glass be used in the formation of the sheet, the term "pot" glass being well understood in the art. Suffice it is to say that such glass is desirable because of the generally high quality.

Referring to Fig. 1, the numeral 10 designates a pot shown in dotted lines in a tipped position, which is the position assumed when the glass is poured onto the supporting member 11, which member is preferably of a size to contain an entire potful of molten glass. Because of the fine quality of glass which can be produced in a pot, it is preferred that the molten glass be created in this manner, but obviously charges of glass can be supplied to the container 11 from a tank furnace or the like, if desired. Associated with the support or container 11 is a pair of sheet forming rolls 12, arranged to create a sheet forming pass therebetween. The molten glass 13 is adapted to be passed through the sheet forming pass, which pass controls the thickness of sheet 14 produced. A slab or the like 15 may be positioned in the manner illustrated in Fig. 1 to guide the sheet 14 from the forming rolls.

A conveyor 16, trained about the drums 17, either one of which or both may be positively driven, is adapted to support and convey the sheet 14 which passes from the slab 15. Table rails 18 may be placed beneath the upper horizontal run of the conveyor 16 to support the same in a manner that the sheet rests upon a flat surface.

It is preferred that the sheet of glass 14 be produced at a relatively high rate of speed so that the molten mass 13 will not become unduly chilled, and to leave the glass in contact with the forming rolls a relatively short time. During the formation of the sheet, therefore, the conveyor 16 is operated at a speed substantially identical with the peripheral speed of the rolls 12, which of course is the same as the movement of the sheet 14. Further, the length of the conveyor 16 is such that the entire sheet formed from the mass of molten glass 13 can be supported at one time on the upper horizontal run of the conveyor. In one embodiment of the invention, as soon as the entire sheet is resting on the conveyor 16, the conveyor is stopped. It is then started again at a relatively slower speed and preferably at a speed similar to the speed of the leer rolls 19 arranged within the annealing leer 20, which speed is relatively much less than the speed at which the sheet is formed. It is not desirable to move the sheet as rapidly during the annealing thereof as during the forming because of the unnecessarily long leer thus required. Upon restarting of the conveyor 16, the sheet may be passed over a roll 21 and then through the annealing leer, which is preferably provided at its intake end with temperature control means 22 for the purpose of assisting in obtaining proper annealing. It may also be desirable to elevate the temperature of the glass sheet at the intake end of the leer to a temperature above the critical annealing range of glass, thus relieving or removing strains introduced in the glass when forming it into a sheet, etc. The numeral 23 designates the sheet as it passes from the cold end of the leer.

The conveyor 16, shown in Fig. 1, may be formed from asbestos, a non-corrosive metal, or the like. To prevent too rapid chilling of the glass sheet while on the conveyor 16, temperature control means 24 are provided, and as shown some of the means 24 are adapted to act in close proximity to the sheet, while others are positioned to act upon the lower run of the conveyor.

In Fig. 2 a modified construction is illustrated showing a plurality of conveyors 25, so that instead of having a single conveyor as in Fig. 1, a plurality of conveyors are arranged to support the sheet 26 immediately after it has been formed by the rolling mechanism 27. It is preferred, however, that the conveyors 25 be driven as a unit and their speed of movement synchronized. As in the case of the single conveyor, the conveyors 25 are, during the sheet forming stage, moved at the same speed as the peripheral speed of the forming rolls. Then, when the entire sheet is being supported upon the conveyors, they are stopped and then restarted so that the sheet moves forward at substantially the same speed as that of the leer rolls 28. To protect the sheet after it has been slowed down and before it enters the leer, a vertically adjustable hood 29 may be used, illustrated diagrammatically as being supported by an adjustable cable 30. During the rolling of the glass into sheet form, the hood is arranged in an elevated position as indicated in dotted lines in Fig. 2. As soon as the entire sheet is supported upon the conveyors 25 and its speed has been reduced, the hood is lowered whereby to prevent chilling of the glass as it passes relatively slowly into the annealing leer 31. After the entire sheet has passed into the leer 31 from the conveyor, the hood is raised and thereby made ready for the next rolling operation. It is possible to anneal the sheet at a much lower rate of speed than that at which the sheet is formed without difficulty because the present process is intermittent. By proper timing of the rolling operation, therefore, a sheet can be rolled relatively fast and annealed slowly and yet cause no piling up of the sheets in the annealing leer.

In Fig. 3 is illustrated a modified form of conveyor which comprises a plurality of links 32 pivotally associated by means of the cross rods 33. As shown in Fig. 4, the shape of the links 32 is preferably such that a "solid top" table is formed. The term "solid top" is here used to designate a table substantially free from openings or portions where the plastic sheet can sag. A drum 34 is provided to drive the conveyor, mainly by frictional contact. Of course, the conveyor can be formed in many other ways, and therefore the invention is not to be construed as limited to any of the types illustrated.

In operation, the molten glass is supplied to the sheet forming pass where it is reduced into a sheet of substantially uniform and predetermined thickness, the length of the sheet formed being dependent upon the quantity of glass rolled and the thickness and width of the sheet. In any event, the conveyors are made sufficiently long to support the entire sheet at one time. The molten glass is rolled into a sheet at a relatively high rate of speed, and during the rolling of the sheet, the conveyor is operated at the same speed as the sheet forming mechanism. As soon as the entire sheet is supported upon the conveyor, it is stopped and then started at a relatively slower speed than the forming speed so that the sheet is fed into the leer at the desired annealing speed. It is preferred that the sheet move at a uniform rate of speed throughout the entire length of the leer.

In another embodiment of the invention, the conveyor is operated a little differently, in that instead of stopping the same as the entire sheet rests thereupon, the speed can be quickly reduced to the annealing speed before the sheet starts to enter the leer. In any event, the speed of the sheet is completely changed between the sheet forming apparatus and the annealing leer. Heating means, either with or without a hood, can be used to protect the sheet while it passes from the sheet forming mechanism to the annealing leer.

No particular type of drive has been shown for the forming mechanism and the conveyor, as any suitable type will be satisfactory. Further, the rolling device can be modified or changed as desired.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The process of producing sheet glass, consisting in forming a sheet of glass at a relatively high rate of speed, supporting and carrying the sheet forwardly upon a movable substantially unbroken surface at the same speed as that of the forming means, then when the entire sheet is positioned on the surface, stopping said surface, and then starting the surface again at a relatively slow speed and passing the sheet through an annealing leer at a speed similar to the relatively slow speed of the surface.

2. The process of producing sheet glass which consists in forming the sheet at a relatively high rate of speed, supporting and carrying the sheet forwardly during formation thereof upon a movable substantially unbroken surface, stopping the movement of said surface after the sheet has been entirely received thereupon whereby to arrest the forward travel of the sheet and facilitate flattening thereof during its period of rest upon said surface, in then resuming movement of the supporting surface to carry the sheet forwardly at a relatively slower speed, and in passing the sheet forwardly at such speed into and through an annealing leer.

3. The process of producing sheet glass consisting in forming the sheet at a relatively high rate of speed, passing the sheet forwardly in a substantially straight line from its point of formation at a relatively low rate of speed into and through an annealing leer, in temporarily supporting the sheet between the point of formation and the exit end of the annealing leer upon a substantially unbroken surface, in receiving the sheet upon said surface while travelling at its speed of formation, in arresting the forward movement of the sheet while upon said surface to facilitate flattening thereof and in then resuming forward travel of the sheet and delivering it from said surface at a relatively slower speed.

Signed to Toledo, in the county of Lucas and State of Ohio, this 6th day of June, 1928.

JOHN L. DRAKE.